Figure 1:
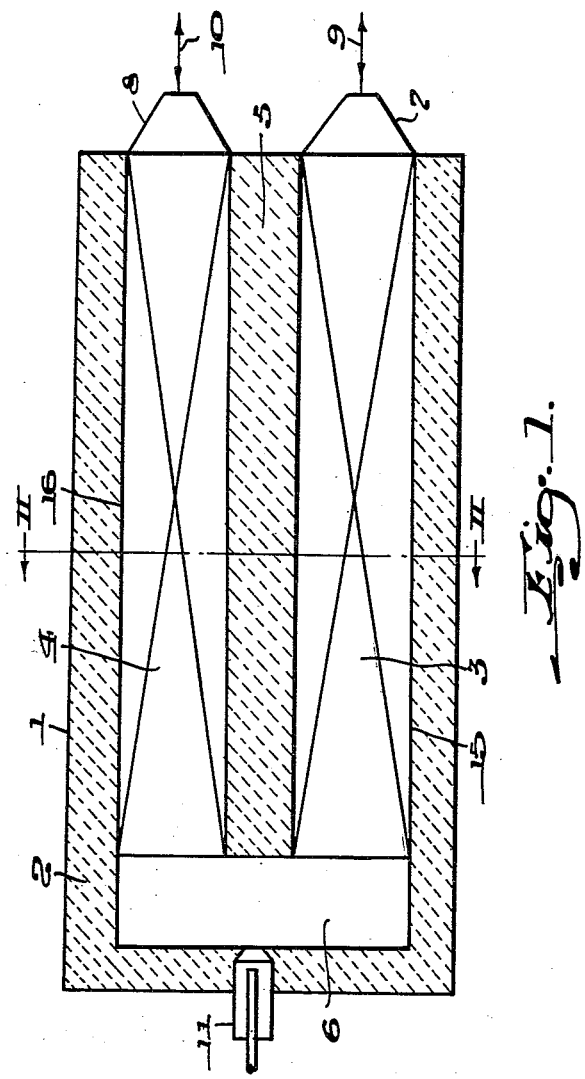

INVENTOR.
RUDOLPH L. HASCHE

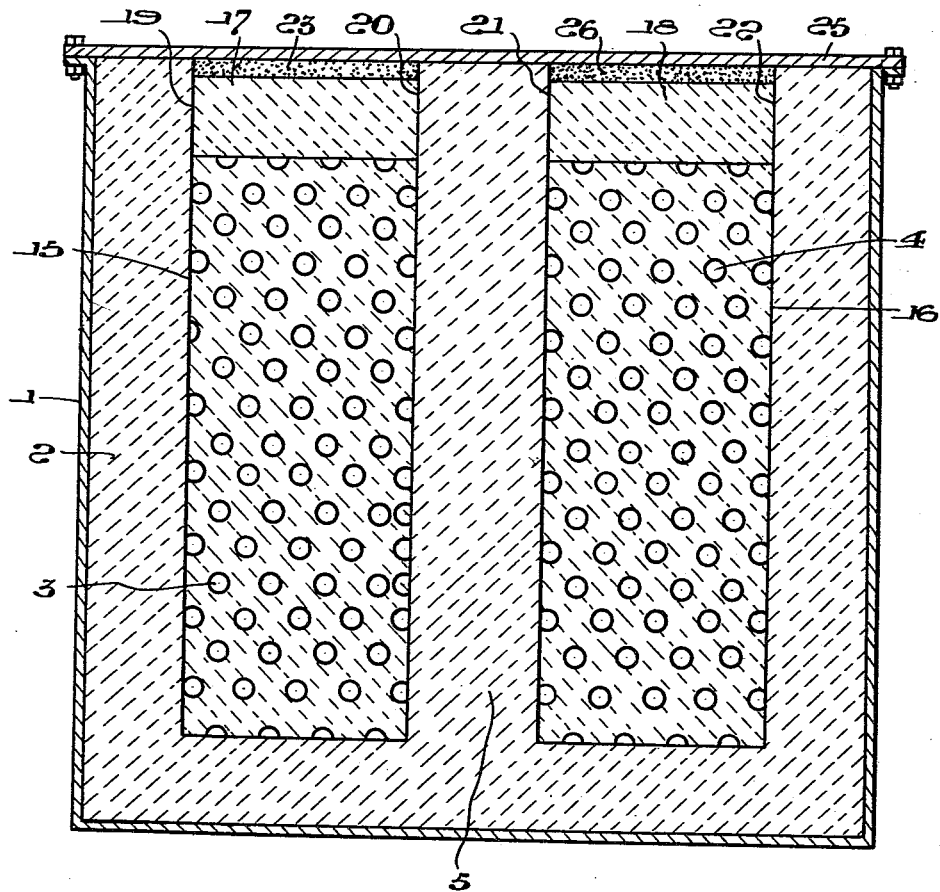

United States Patent Office 2,766,980
Patented Oct. 16, 1956

2,766,980

REGENERATIVE FURNACES

Rudolph L. Hasche, Johnson City, Tenn.

Application October 2, 1952, Serial No. 312,732

5 Claims. (Cl. 263—51)

The present invention relates to new and improved heat regenerative masses and apparatus and more particularly to improvements in regenerative furnaces utilizing horizontally disposed regenerative masses having a horizontal major axis. Still more particularly, it relates to novel constructional features in regenerative masses in which the major axis is disposed in a horizontal plane and employing as regenerative units, loosely disposed refractory materials such as ceramic tiles which are flat in shape and rest upon each other with flues or slots formed between the flat surfaces thereof serving as passageways for the gas stream to be heated and the gas stream to be cooled by the regenerative mass.

In Serial No. 129,969, filed November 29, 1949, and now abandoned in favor of U. S. Patents Nos. 2,662,864 and 2,692,131 which are continuations in part thereof, are shown ceramic tile units for regenerative masses containing half flues in staggered relationship on both sides of comparatively thin flat tiles. These tiles with the dimensions specified in the application give remarkable efficiency in transferring heat to or from gas passing through a regenerative mass of which the tiles form a part. The preferred form of regenerative mass is of the horizontally disposed type in which the tiles rest upon each other by gravity and form a compact mass with equally spaced flues running horizontally through and which are substantially uninterrupted except for joints formed by the ends of the tiles.

Although in the past the advantages of a horizontal form of regenerative mass have been recognized, the serious difficulty encountered has been the tendency of gas to channel over the top of the regenerative mass. It is well known to those skilled in the art that flat ceramic tiles which have been fired at high temperatures depart somewhat from the true flatness and even with the greatest care in manufacture show some warpage. Since the new type of tiles which are preferred, as disclosed in my copending application, are comparatively thin, a commercial regenerative mass consists of a large number of tiles piled one on top of another and during operation particularly under high temperatures as is encountered in regenerative furnaces, the gravitational weight of the tiles pressing upon each other relieves the warpage and causes return to true flatness. This causes a considerable compacting of the stack of tiles in a vertical direction and leaves a channel of considerable width between the top of the stack of regenerative tiles and the enclosing insulating brick at the top. Gases being passed through the regenerative mass tend to flow through the channel and hence by-pass the mass itself. This is very undesirable and results in great inefficiencies.

The present invention provides a means for preventing such channeling and hence by-passing of gas around the mass. The present invention prevents such channeling by providing for a floating top of insulation brick which lies by gravity on the top of the tile stack and moves upwardly and downwardly therewith so that when the mass has been compacted there is no channel formed between the tiles and the insulating brick to cause by-passing of the gas passing through the regenerator. The present invention further provides for a layer of insulating, compressed and elastic material between the top of the insulating brick and the steel shell or top cover of the furnace so that as the insulating ceramic floating top settles with the regenerative mass, the elastic compressed cushion of material at the top can expand without leaving a passage for by-passing of gas.

More specifically the present invention prevents such channeling by providing a layer of insulating brick located on top of the mass and adapted to float upwardly and downwardly with the top of the mass, a layer of compressed elastic material located on top of the floating brick, the tendency of the compressed material to expand asserting at least during the time of tile expansion and preferably at all times a continuous downward force upon the floating brick, and hence upon the top mass, the compressed material being adapted to expand upon downward movement of the top of the mass and the floating brick, thereby preventing an open space from forming above the mass and hence the gases from by-passing the mass, and to be compressed by upward movement of the top of said mass and the floating brick, and means for asserting continuous force upon the top of the compressed material to maintain the same in a compressed state at least during the time of tile expansion, and preferably at all times so as to assert the downward force on the floating brick and the top of the mass.

The features of this invention may be applied quite generally to regenerative masses disposed in a horizontal plane and made up of tile units stacked vertically regardless of the use to which the regenerative masses are applied. For example, the present invention may be employed for alternate recovery of heat from blast furnace or reverberatory furnace gases and to heating of blast air or combustion air. The regenerative mass may also be applied to pre-heating air or steam to high temperature or it may be applied in a furnace such as that described in my copending applications Serial Nos. 180,757, filed August 22, 1950, 154,185, filed April 5, 1950, 353,361, filed May 6, 1953, and 277,685, filed March 20, 1952, in which chemical reactions are carried out, for example, in producing reformed gas for heating purposes or acetylene or ethylene.

A typical example of the application of my invention to a furnace for the production of heating gas will be described as an example.

In Figure I is shown a longitudinal cross-section in a horizontal plane through a furnace to produce reformed gas for heating purposes. It consists of a gas type shell 1 lined with insulating brick 2 and two chambers 15 and 16, containing regenerative masses 3 and 4 separated by a bridge wall 5. A reaction chamber 6 is provided at one end of each of the regenerative masses. Such reaction chamber connects the ends of the masses, allowing gas passage therethrough. At the other end of the regenerative masses are chambers 7 and 8 for introducing and withdrawing gases through pipes 9 and 10. To start the furnace a burner 11 is provided for heating the chamber 6 and the contiguous ends of the regenerative masses 3 and 4 to a temperature of above 1,000° F. Operation is performed by alternating the flow of a mixture of hydrocarbon and air through pipes 9 and 10.

Figure II, which is section II—II of Figure I, shows steel gas-tight shell 1, insulating brick 2 and bridge wall 5 providing two like chambers 15 and 16 containing the ceramic tiles which comprise the regenerative masses 3 and 4. These tiles are stacked as indicated in the drawing and at the top of the stacks are provided floating masses of insulating brick 17 and 18 which are free to move as the tiles become compacted due to relief of warpage. Joints 19, 20, 21 and 22 are free of mortar so that free vertical movement is allowed. Tension on the floating top is provided for by cushions 23 and 26 consisting of vermiculite. This material can be compressed many fold so that as the floating top moves with the compacting of the tile stacks the vermiculite layer expands and forms an excellent seal without leaving a channel for gas by-passing. Tension is applied to the vermiculite by the steel covering 25 which is part of the gas-tight shell of the furnace.

The present invention eliminates the difficulty experienced in horizontal furnaces employing regenerative masses consisting of loosely disposed refractories such as loose known types of checker tile stacked one upon the other by effectively eliminating gas by-passing. At the same time the checker tiles comprising the regenerative mass are allowed freedom of movement due to the expansion and contraction from heat and compacting due to relief of warpage. The present invention is particularly adapted to be used with regenerative masses retained in cavities or chambers with straight vertical walls, and which are disposed in a horizontal plane and in which the major axis is horizontal. Any compressible material similar to vermiculite may be used as a compressed, elastic material, such as any crushed refractory material or fibrous asbestos.

Although the present invention is particularly adapted to be used with the apparatus herein described, it may also be advantageously applied to any horizontal furnace containing any types of horizontally disposed masses such as a pebble bed or cracked refractory bed, etc.

I claim:

1. In a regenerative furnace comprising at least one horizontally disposed regenerative mass having a horizontal major axis and being located within cavities with straight vertical walls, wherein the top of said mass moves upwardly and downwardly during furnace operation due to expansion, contraction and compacting, said downward movement of the top of said mass resulting in the formation of an open space above the top of said mass, through which gases by-pass around said mass; the improvement comprising: a layer of insulating brick located on top of said mass and adapted to float upwardly and downwardly with the top of said mass, a layer of compressed elastic material located on top of said insulating brick, said compressed material having a tendency to expand thereby asserting a downward force upon said floating brick, and hence upon the top of said mass, said compressed material being adapted to expand upon downward movement of the top of said mass and said floating brick, thereby preventing said open space from forming and hence said gases from by-passing said mass, and to be compressed by upward movement of said top of said mass and said floating brick, and means for asserting force upon the top of said compressed, elastic material to maintain the same in a compressed state so as to assert said downward force on said floating brick and said top of said mass.

2. The furnace of claim 1 in which said compressed elastic material is vermiculite.

3. The furnace of claim 1 in which said compressed elastic material is fibrous asbestos.

4. The furnace of claim 1 in which said regenerative mass is composed of ceramic tile units.

5. The furnace of claim 4 in which said regenerative mass is perforated throughout its length by a plurality of equally spaced straight, uninterrupted flues.

References Cited in the file of this patent

UNITED STATES PATENTS

| | | |
|---|---|---|
| 335,699 | Herreshoff | Feb. 9, 1886 |
| 1,341,970 | Chantraine | June 1, 1920 |
| 2,089,001 | Murray | Aug. 3, 1937 |
| 2,205,242 | Davis et al. | June 18, 1940 |
| 2,303,247 | Woods | Nov. 24, 1942 |